(12) United States Patent
Petroff et al.

(10) Patent No.: US 9,476,438 B2
(45) Date of Patent: Oct. 25, 2016

(54) GLASS CLAMP FOR A VEHICLE MIRROR ASSEMBLY

(71) Applicant: Lang-Mekra North America LLC, Ridgeway, SC (US)

(72) Inventors: Alexandre Petroff, Columbia, SC (US); Andreas Enz, Columbia, SC (US)

(73) Assignee: Lang-Mekra North America LLC, Ridgeway, SC (US)

(*) Notice: Subject to any disclaimer, the term of this patent is extended or adjusted under 35 U.S.C. 154(b) by 208 days.

(21) Appl. No.: 14/064,339

(22) Filed: Oct. 28, 2013

(65) Prior Publication Data

US 2015/0116854 A1  Apr. 30, 2015

(51) Int. Cl.
    *G02B 7/182* (2006.01)
    *G02B 5/08* (2006.01)
    *F16B 2/12* (2006.01)
    *B60R 1/06* (2006.01)

(52) U.S. Cl.
    CPC . *F16B 2/12* (2013.01); *B60R 1/06* (2013.01); *G02B 7/182* (2013.01); *Y10T 24/44017* (2015.01)

(58) Field of Classification Search
CPC .. G02B 7/182; G02B 19/0042; G02B 7/198; G02B 5/08; G02B 23/2476; G02B 7/00; G02B 7/1824; B60R 1/06; B60R 1/074; B60R 1/0605; B60R 1/072; B60R 1/078; B60R 1/00; B60R 1/02; B60R 2011/0033
USPC .................... 359/841, 844, 871, 872
See application file for complete search history.

(56) References Cited

U.S. PATENT DOCUMENTS

| | | | | |
|---|---|---|---|---|
| 4,247,871 A | * | 1/1981 | Hirsch | H01J 29/898 348/835 |
| 7,677,741 B2 | * | 3/2010 | Chuang | 359/844 |

* cited by examiner

*Primary Examiner* — Jade R Chwasz
(74) *Attorney, Agent, or Firm* — McNair Law Firm, P.A.; Seann P. Lahey

(57) ABSTRACT

An exterior vehicle mirror assembly including an housing with a mirror glass disposed in the housing. A glass clamp connects the mirror glass and the housing. The glass clamp is slidably carried on both the mirror glass and the housing for moving between a locked position in which the glass clamp secures the mirror glass to the housing in a friction fit arrangement to resist movement of the mirror glass in the housing, and an unlocked position in which the clamp is free to be removed from the housing and mirror glass.

26 Claims, 5 Drawing Sheets

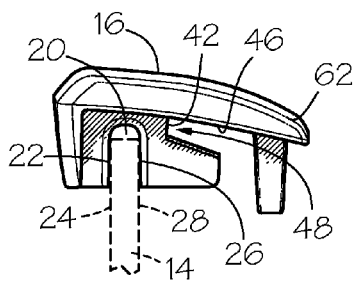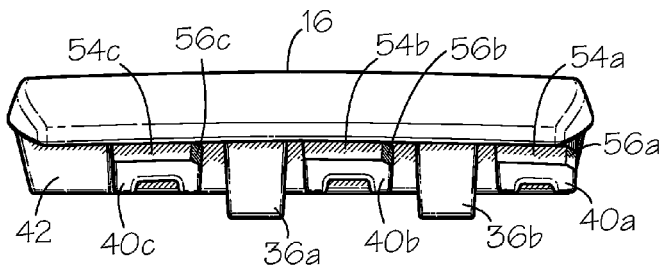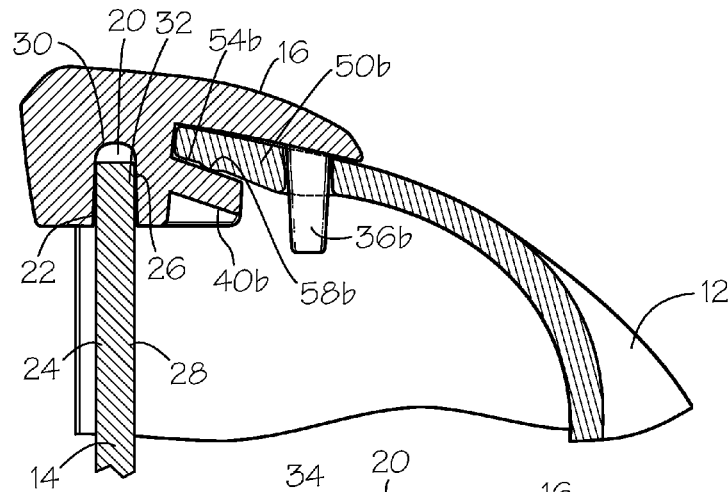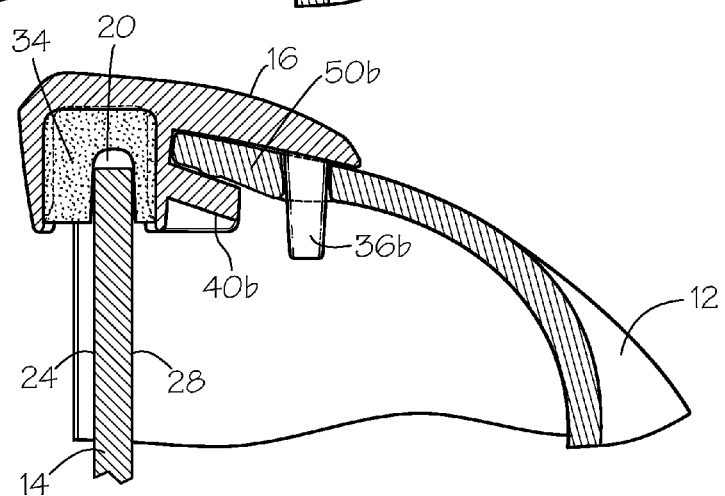

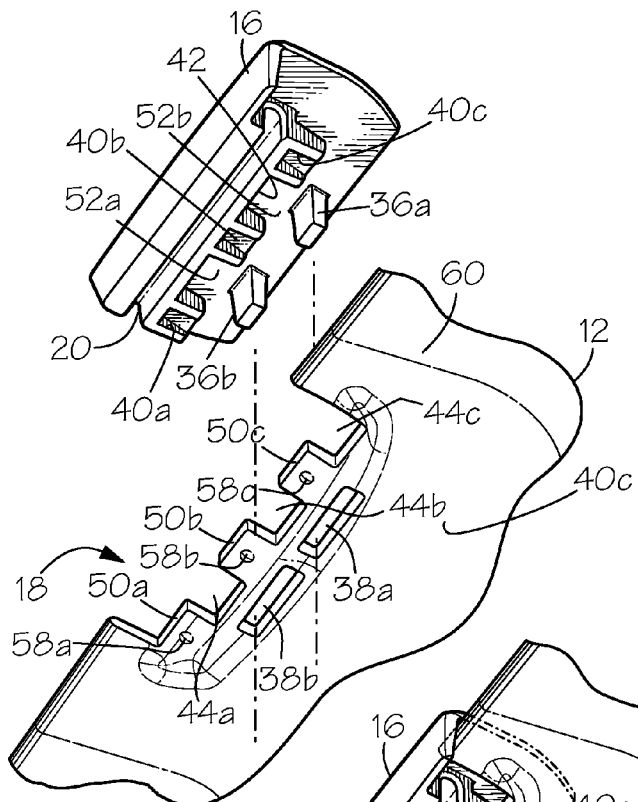
*Fig. 6*
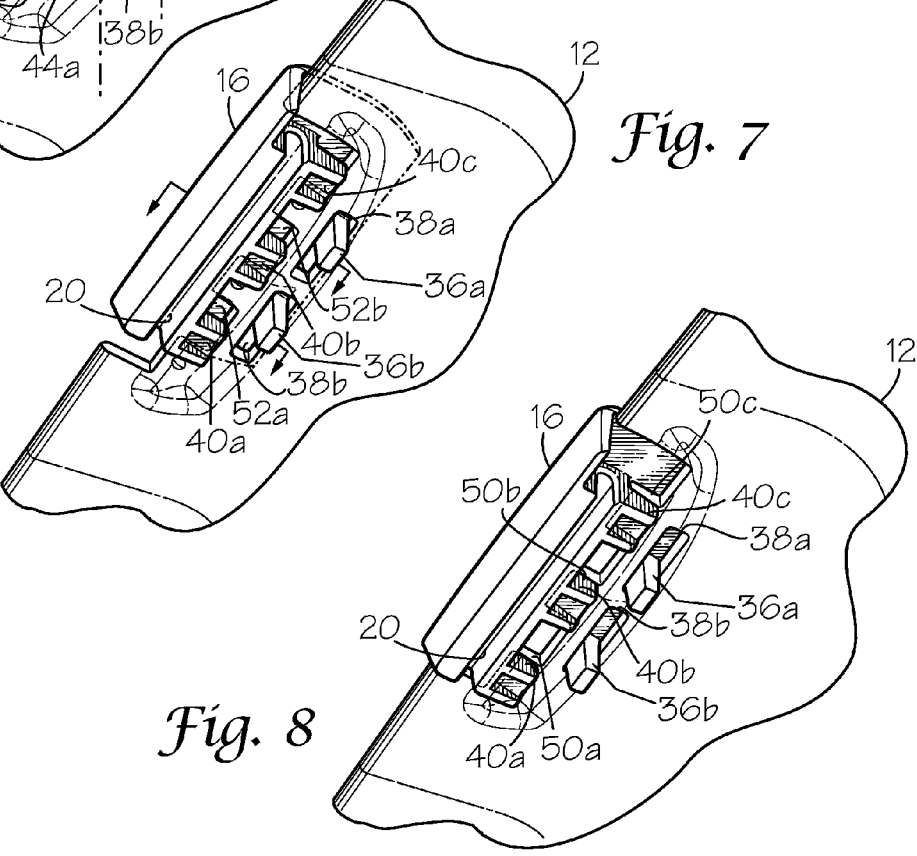
*Fig. 7*
*Fig. 8*

GLASS CLAMP FOR A VEHICLE MIRROR ASSEMBLY

BACKGROUND OF THE INVENTION

1) Field of the Invention

The present invention relates to vehicle mirror assemblies, and more particularly, to an exterior mirror assembly in which the mirror glass is releasably secured to the mirror head housing by a sliding glass clamp.

2) Description of Related Art

The mirror glass unit in a typical exterior vehicle mirror assembly includes a reflective mirror plate, which is fixed to a glass carrier plate to support the mirror glass in the mirror head. Adhesives are commonly used for securing the components together in a fixed arrangement. This requires precise manufacturing techniques to hold the mirror plate in the desired position while setting the adhesive and to protect the edge area of the mirror glass from damage. These techniques require comparatively low tolerances that must be observed with regard to the shape of the mirror glass which results in higher production costs. Additionally, there is the risk of excess adhesives spilling over onto the mirror glass and thus the mirror glass becoming contaminated when affixing the mirror plate to the glass carrier plate. This requires elaborate cleaning to remove the adhesive, which also leads to increased production costs.

Further, if the mirror glass is ever broken, the entire glass unit must be replaced. Replacing the glass unit can require a significant disassembly of the mirror head to be able to remove the carrier plate.

Accordingly, in view of the problems associated with mounting a mirror glass to a carrier plate, it is an object of the present invention to provide a mirror head for vehicle mirrors that does not require a carrier plate for the mirror glass.

It is another object of the present invention to provide a mirror head for a vehicle in which the mirror glass can be easily replaced if broken without a significant disassembly of the mirror head or the required replacement of additional support components.

SUMMARY OF THE INVENTION

The above objectives are accomplished according to the present invention by providing an exterior vehicle mirror assembly, comprising a housing; a mirror glass disposed in the housing; and, a glass clamp connecting the mirror glass and the housing; wherein the glass clamp is slidably carried on both the mirror glass and the housing to operate between a locked position and an unlocked position releasably securing the mirror glass to the housing.

In a further advantageous embodiment, the glass clamp engages a perimeter edge portion of each the mirror glass and the housing.

In a further advantageous embodiment, the glass clamp includes a glass receiving channel having a first interior side surface engaging a front surface of the mirror glass, and a second interior side surface engaging a rear surface of the mirror glass.

In a further advantageous embodiment, the first and second interior side surfaces taper inwardly toward each other to a base surface of the glass receiving channel so that the mirror glass is wedged into the glass receiving channel for eliminating play between the mirror glass and the glass clamp.

In a further advantageous embodiment, a vibration dampening member is disposed in the glass receiving channel for engaging the mirror glass.

In a further advantageous embodiment, a guide prong is carried by the glass clamp being received into a complementary elongated guide slot in the housing, wherein the guide prong travels along the guide slot to control lateral shifting of the glass clamp on the housing.

In a further advantageous embodiment, a locking projection is carried by the glass clamp, wherein the locking projection is received into a complementary housing recess when the glass clamp is in the unlocked position, and the locking projection engaging the housing when in the locked position.

In a further advantageous embodiment, the locking projection is spaced apart from a bottom surface of the glass clamp to define a housing receiving channel so that a portion of the housing is disposed between the locking projection and the bottom surface in a friction fit arrangement when the glass clamp is in the locked position.

In a further advantageous embodiment, an angled engaging surface is disposed on the locking projection, wherein sliding the glass clamp to the locked position causes the angled engaging surface to bias against a portion of the housing so that the housing is wedged between the bottom surface and the angled engaging surface of the locking projection to secure the glass clamp to the housing.

In a further advantageous embodiment, a beveled edge is included adjacent the angled engaging surface for receiving and directing the housing onto the angled engaging surface when sliding the glass clamp to the locked position.

In a further advantageous embodiment, a knob is disposed on an interior side of the housing biasing against the locking projection when the glass clamp is in the locked position for increasing the friction fit of the housing in the housing receiving channel of the glass clamp.

In a further advantageous embodiment, the glass clamp includes a base plate having a bottom surface with a complementary curvature to a portion of the housing receiving the glass clamp so that the bottom surface engages generally flush against the housing.

In a further advantageous embodiment, a support wall is carried in the housing engaging a rear surface of the mirror glass for supporting and positioning the mirror glass in the housing.

In a further advantageous embodiment, a vibration dampening member is carried by the support wall and engaging the mirror glass to resist vibration of the mirror glass in the housing.

In a further advantageous embodiment, a retaining lip is disposed along a perimeter edge portion of the housing engaging a front surface of the mirror glass, wherein the mirror glass is releasably carried between the retaining lip and the support wall.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 shows a side view of the glass clamp according to the present invention;

FIG. 4 shows a rear view of the glass clamp according to the present invention;

FIG. 5A shows a side cross-section view of a portion of the housing and glass clamp according to the present invention;

FIG. 5B shows an alternative embodiment side cross-section view of a portion of the housing and glass clamp according to the present invention;

FIG. 6 shows an exploded view from an interior side portion of the housing that receives the glass clamp according to the present invention;

FIG. 7 shows a detailed perspective view of the glass clamp in an unlocked position on the housing from an interior side according to the present invention;

FIG. 8 shows a detailed perspective view of the glass clamp in a locked position on the housing from an interior side according to the present invention; and, FIG. 9 shows a front cross-section view of the glass clamp in a locked position on the housing according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment(s) and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below. Such objects, features, benefits and advantages will be apparent from the above in conjunction with the accompanying detailed description and figures and all reasonable inferences to be drawn therefrom.

DETAILED DESCRIPTION OF A PREFERRED EMBODIMENT

Figure 1:
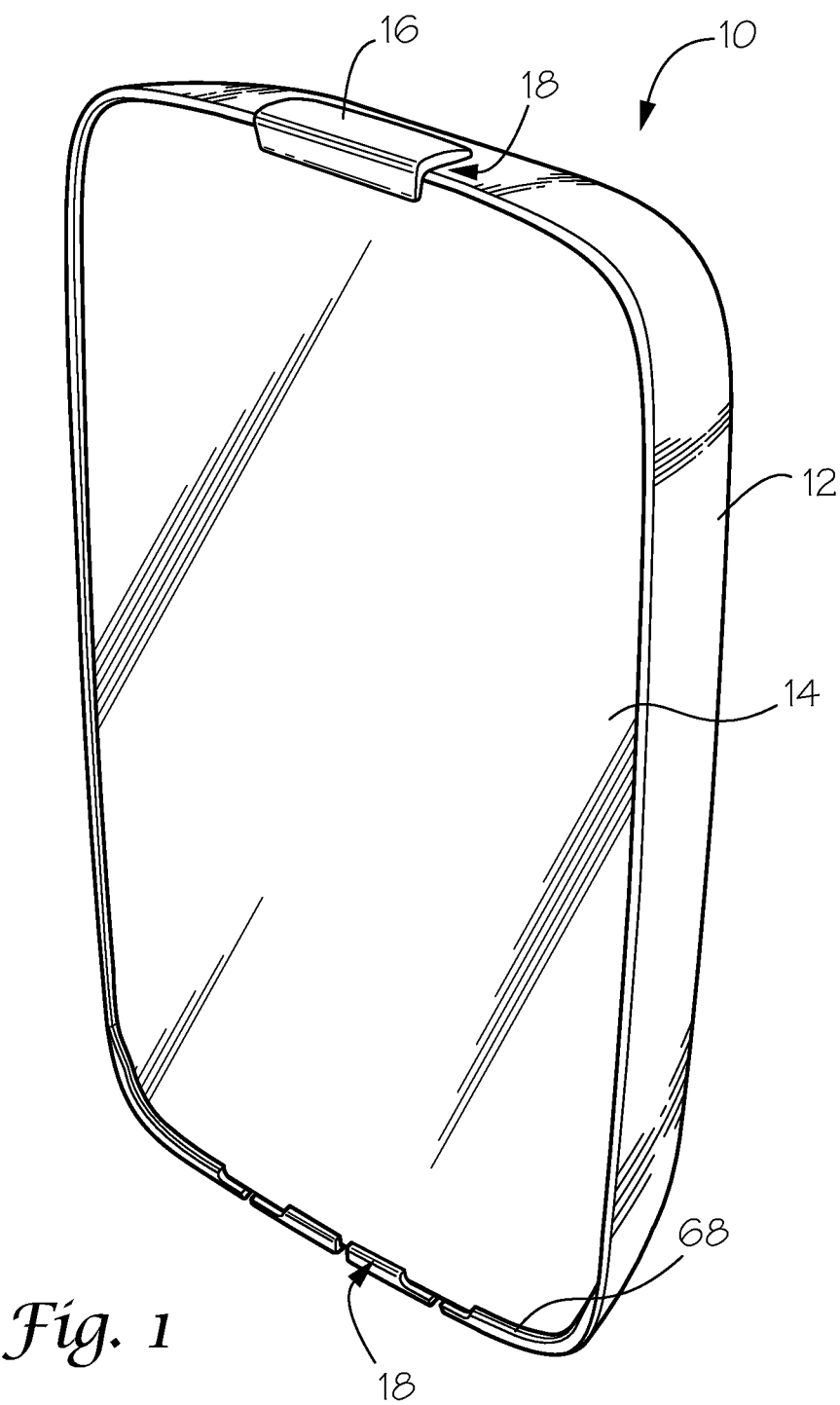
FIG. 1 shows a front perspective view of a mirror head according to the present invention.

With reference to the drawings, the invention will now be described in more detail. Referring to FIG. 1, a mirror head, designated generally as 10, of an exterior vehicle mirror assembly is shown. Mirror head 10 includes a housing 12 which secures and supports a mirror glass 14 disposed in the housing. A glass clamp 16 connects mirror glass 14 and housing 12. Glass clamp 16 is slidably carried on both mirror glass 14 and housing 12 to operate between a locked position, in which glass clamp 16 secures mirror glass 14 to housing 12 in a friction fit arrangement to resist movement of mirror glass 14 in housing 12, and an unlocked position in which glass clamp 16 is free to be removed from housing 12 and mirror glass 14 for removing mirror glass 14 from housing 12.

Referring to FIG. 1, in the illustrated embodiment, glass clamp 16 engages a perimeter edge portion, designated generally as 18, of each mirror glass 14 and housing 12. In the illustrated embodiment, glass clamp 16 is disposed along a top perimeter edge portion end of housing 12, but may alternatively be located along any perimeter edge portion of housing 12 and is not limited in application to the illustrated arrangement.

Referring to FIGS. 3 and 5A, glass clamp 16 includes a glass receiving channel 20 having a first interior side surface 22 engaging a front surface 24 of the mirror glass 14, and a second interior side surface 26 engaging a back surface 28 of mirror glass 14.

As best shown in FIG. 5A, first and second interior side surfaces 22 and 26 taper inwardly toward each other to a base surface 30 of glass receiving channel 20 so that mirror glass 14 is wedged into glass receiving channel 20 for eliminating play between mirror glass 14 and glass clamp 16. In the illustrated embodiment, glass receiving channel 20 narrows sufficiently so that distal end 32 of mirror glass 14 is prevented from engaging base surface 30 of glass receiving channel 20.

Referring to FIG. 5B, in an alternative embodiment, glass receiving channel 20 includes a vibration dampening member 34 for engaging front surface 24 and back surface 28 of mirror glass 14. Vibration dampening member 34 assists in stabilizing mirror glass 14 in housing 12 for providing a stable image to the vehicle driver.

Referring to FIGS. 6-8, in the illustrated embodiment, a pair of guide prongs 36a and 36b are carried by glass clamp 16 that are received into a respective complementary elongated guide slot 38a and 38b in housing 12. Guide prongs 36a and 36b travels along guide slots 38a and 38b to control lateral shifting of glass clamp 16 on housing 12 when moving between locked and unlocked positions. Guide prongs 36a and 36b are only removable from guide slots 38a and 38b when glass clamp 16 is moved to the unlocked position, as shown in FIGS. 6 and 7. When glass clamp 16 is in the locked position of FIG. 8, guide prongs 36a and 36b are secured in guide slots 38a and 38b, which resist twisting and unwanted movement of glass clamp 16 on housing 12. While the illustrated embodiment preferably includes a pair of guide prongs, a single guide prong may be used instead, particularly if the size of glass clamp 16 is reduced, such as when using a plurality of smaller glass clamps positioned around the perimeter edge of housing 12.

Referring to FIGS. 4 and 6, in the illustrated embodiment, a series of locking projections 40a, 40b and 40c are carried by glass clamp 16. Each of locking projections 40a, 40b and 40c extend laterally outward from a side wall 42 of glass receiving channel 20, see also FIG. 3. Locking projections 40a, 40b and 40c are received into a respective complementary housing recess 44a, 44b, and 44c when glass clamp 16 is in the unlocked position, see FIGS. 6 and 7. While in the locked position (FIGS. 8 and 9), locking projection 40a, 40b and 40c engage housing 12 to hold glass clamp 16 secure against housing 12. While the illustrated embodiment preferably includes a series of locking projections, a single locking projection may be used instead, particularly if the size of glass clamp 16 is reduced, such as when using a plurality of smaller glass clamps positioned around the perimeter edge of housing 12.

Referring to FIG. 3, locking projections 40a, 40b and 40c are spaced apart from a bottom surface 46 of glass clamp 16 to define a housing receiving channel, designated generally as 48, so that a portion of housing 12 is disposed between locking projections 40a, 40b and 40c and bottom surface 46 in a friction fit arrangement when glass clamp 16 is in the locked position.

Figure 9:
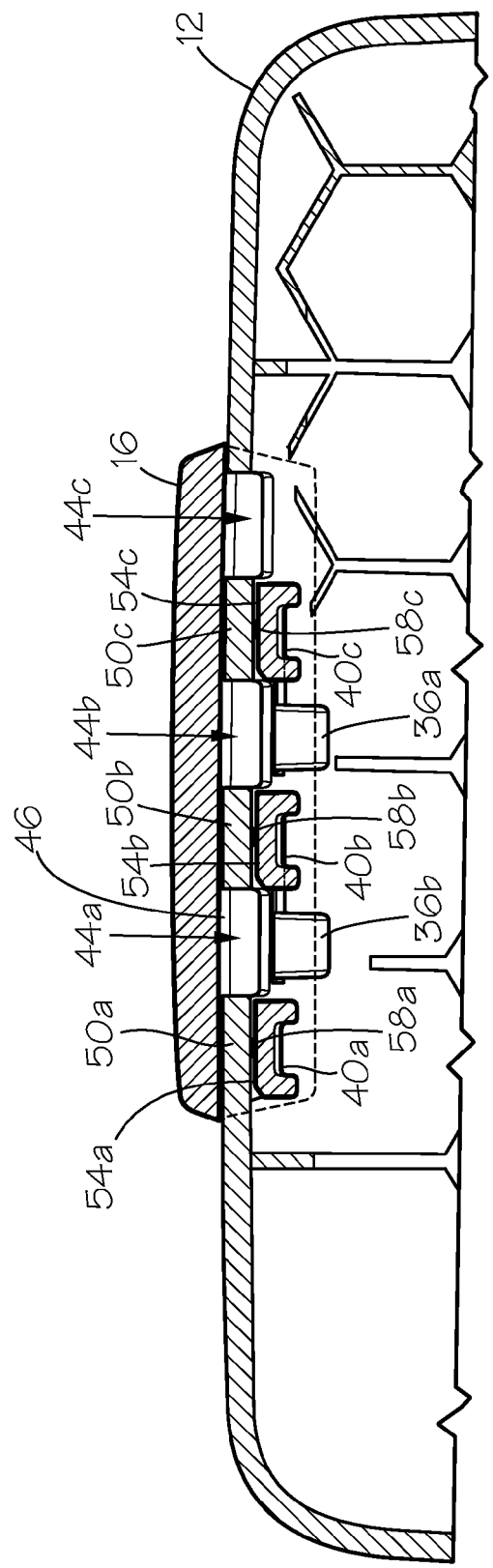

Referring to FIGS. 6 and 9, the illustrated embodiment includes a series of housing projections 50a, 50b, and 50c define housing recesses 44a, 44b, and 44c along perimeter edge portion 18 of housing 12. In the illustrated embodiment, with further reference to FIG. 7, locking projections 40a, 40b and 40c are laterally spaced from each other along side wall 42 (FIG. 3) to define a series of projection receiving gaps 52a and 52b. Housing projections 50b and 50c are received, respectively, through projection receiving gaps 52a and 52b into housing receiving channel 48 when mounting glass clamp 16 to housing 12. Housing projection 50a is not received into a specific projection receiving gap in the illustrated embodiment as this portion of housing 12 is aligned generally at a distal of glass clamp 16 adjacent locking projection 40a, thus no projection receiving gap is required at that location. Accordingly, referring to FIGS. 7-9, a lateral shifting of glass clamp 16 biases locking projections 40a, 40b and 40c against housing projections 50a, 50b, and 50c, respectively, in a friction fit arrangement.

In the illustrated embodiment, referring to FIGS. 4 and 9, an angled engaging surface 54a, 54b, 54c is disposed on locking projections 40a, 40b and 40c, respectively. Accordingly, sliding glass clamp 16 to the locked position causes each angled engaging surface 54a, 54b, 54c to bias against a portion of housing 12, particularly against housing projections 50a, 50b, and 50c, respectively. As a result, housing projections 50a, 50b, and 50c are wedged between bottom surface 46 and angled engaging surfaces 54a, 54b, 54c of locking projections 40a, 40b and 40c to secure glass clamp 16 to housing 12.

Referring to FIG. 4, a beveled edge 56a, 56b, 56c is included adjacent each of angled engaging surfaces 54a, 54b, 54c, respectively, for receiving and directing housing 12, specifically, housing projections 50a, 50b, and 50c onto the adjacent angled engaging surface 54a, 54b, 54c when sliding glass clamp 16 to the locked position.

Referring to FIGS. 5A, 6 and 9, a knob 58a, 58b, and 58c is disposed on an interior side 60 of housing 12, particularly on each of housing projections 50a, 50b, and 50c, respectively. In the illustrated embodiment, knobs 58a, 58b, and 58c bias against locking projections 40a, 40b and 40c, and more particularly against angled engaging surfaces 54a, 54b, 54c respectively, when glass clamp 16 is in the locked position for increasing the friction fit of housing 12 in housing receiving channel 48 of glass clamp 16.

Referring to FIG. 3, glass clamp 16 includes a base plate 62 defining bottom surface 46. Base plate 62 includes a complementary curvature to the portion of housing 12 receiving glass clamp 16 so that bottom surface 46 engages generally flush against housing 12, see FIG. 9.

Figure 2:
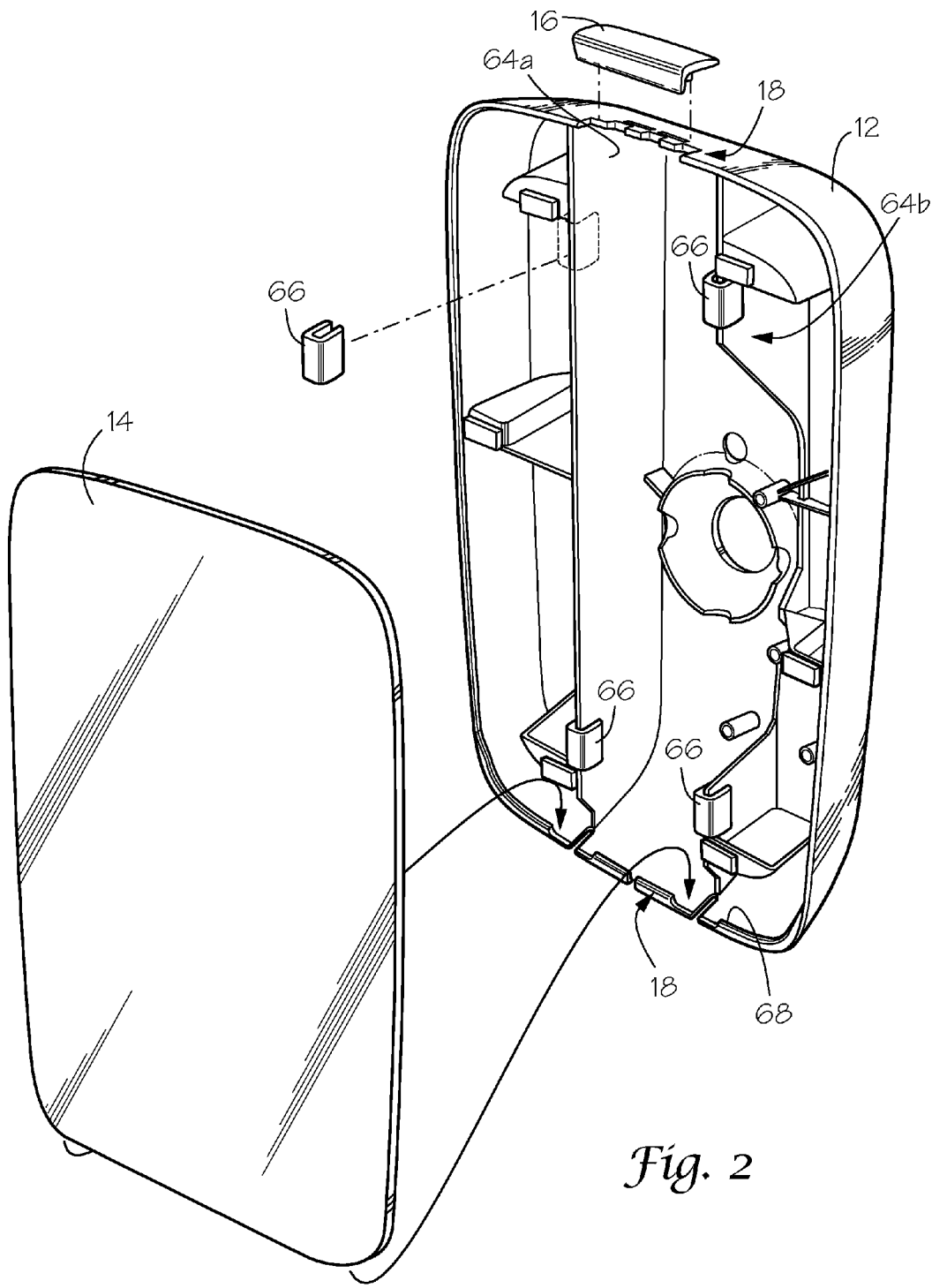
FIG. 2 shows an exploded front perspective view of a mirror head according to the present invention.

Referring to FIG. 2, a series of support walls 64a and 64b are carried in housing 12 for engaging back surface 28 of mirror glass 14 for supporting and positioning mirror glass 14 in housing 12 so that glass clamp 16 can secure mirror glass 14 in position when glass clamp 16 is moved to the locked position. Accordingly, a separate carrier plate for mirror glass 14 is not required to mount mirror glass 14 in housing 12.

In the illustrated embodiment of FIG. 2, at least one vibration dampening member 66 is preferably carried by each support wall 64a, 64b engaging rear surface 28 of mirror glass 14 to resist vibration of mirror glass 14 in housing 12.

Referring to FIGS. 1 and 2, a retaining lip 68 is disposed along a perimeter edge portion 18 of housing 12 engaging a front surface of mirror glass 14. Mirror glass 14 is releasably carried between retaining lip 68 of housing 12 and support walls 64a, 64b. By moving glass clamp 16 to the unlocked position, glass clamp 16 can be removed from housing 12 and mirror glass 14 easily removed.

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly, comprising:
    a housing;
    a mirror glass disposed in said housing; and,
    a glass clamp connecting said mirror glass and said housing;
    a glass receiving channel included in said glass clamp, wherein said mirror glass extends into said glass receiving channel and is positioned so that opposing side surfaces of said mirror glass directly engage opposing side surfaces within said glass receiving channel in a friction fit arrangement so that a perimeter edge portion of said mirror glass is secured within said glass receiving channel;
    a guide prong carried by said glass clamp and laterally spaced from said glass receiving channel for engaging said housing;
    a locking projection carried by said glass clamp and disposed between said glass receiving channel and said guide prong for engaging said housing; and,
    wherein said glass clamp is slidably carried on both said mirror glass and said housing to operate between a locked position and an unlocked position releasably securing said mirror glass to said housing.

2. The mirror assembly of claim 1 wherein said glass clamp engages a perimeter edge portion of each said mirror glass and said housing.

3. The mirror assembly of claim 1 wherein said glass receiving channel includes a first interior side surface engaging a front surface of said mirror glass, and a second interior side surface engaging a rear surface of said mirror glass.

4. The mirror assembly of claim 3 including a vibration dampening member disposed in said glass receiving channel for engaging said mirror glass.

5. The mirror assembly of claim 3 wherein said first and second interior side surfaces taper inwardly toward each other to a base surface of said glass receiving channel so that said mirror glass is wedged into said glass receiving channel for eliminating play between said mirror glass and said glass clamp.

6. The mirror assembly of claim 1 wherein said guide prong is received into a complementary elongated guide slot defined by an opening extending through said housing, wherein said guide prong travels along said guide slot to control lateral shifting of said glass clamp on said housing.

7. The mirror assembly of claim 1 wherein said locking projection is received into a complementary housing recess when said glass clamp is in said unlocked position, and said locking projection engaging said housing when in said locked position.

8. The mirror assembly of claim 7 wherein said locking projection is spaced apart from a bottom surface of said glass clamp to define a housing receiving channel so that a portion of said housing is disposed between said locking projection and said bottom surface in a friction fit arrangement when said glass clamp is in said locked position.

9. The mirror assembly of claim 8 including an angled engaging surface disposed on said locking projection, wherein sliding said glass clamp to said locked position causes said angled engaging surface to bias against a portion of said housing so that said housing is wedged between said bottom surface and said angled engaging surface of said locking projection to secure said glass clamp to said housing.

10. The mirror assembly of claim 9 including a beveled edge adjacent said angled engaging surface for receiving and directing said housing onto said angled engaging surface when sliding said glass clamp to said locked position.

11. The mirror assembly of claim 8 including a knob disposed on an interior side of said housing biasing against said locking projection when said glass clamp is in said locked position for increasing said friction fit of said housing in said housing receiving channel of said glass clamp.

12. The mirror assembly of claim 1 wherein said glass clamp includes a base plate having a bottom surface with a complementary curvature to a portion of said housing receiving said glass clamp so that said bottom surface engages generally flush against said housing.

13. The mirror assembly of claim 1 including a support wall carried in said housing engaging a rear surface of said mirror glass for supporting and positioning said mirror glass in said housing.

14. The mirror assembly of claim 13 including a vibration dampening member carried by said support wall and engaging said mirror glass to resist vibration of said mirror glass in said housing.

15. The mirror assembly of claim 13 including a retaining lip disposed along a perimeter edge portion of said housing engaging a front surface of said mirror glass, wherein said mirror glass is releasably carried between said retaining lip and said support wall.

16. An exterior vehicle mirror assembly, comprising:
a housing;
a mirror glass carried in said housing; and,
a glass clamp engaging said mirror glass and said mirror housing;
a glass receiving channel included in said glass clamp, wherein said mirror glass extends into said glass receiving channel and is positioned so that opposing side surfaces of said mirror glass directly engage opposing side surfaces within said glass receiving channel in a friction fit arrangement so that a perimeter edge portion of said mirror glass is secured within said glass receiving channel;
a guide prong carried by said glass clamp and laterally spaced from said glass receiving channel for engaging said housing;
a locking projection carried by said glass clamp and disposed between said glass receiving channel and said guide prong for engaging said housing; and,
wherein said glass clamp is slidably carried on each of said mirror glass and said housing for moving between a locked position in which said glass clamp secured said mirror glass to said housing in a friction fit arrangement to resist movement of said mirror glass in said housing, and an unlocked position in which said glass clamp is free to be removed from said housing and mirror glass for removing said mirror glass from said housing.

17. The mirror assembly of claim 16 wherein said glass clamp includes a glass receiving channel having a first interior side surface engaging a front surface of said mirror glass, and a second interior side surface engaging a rear surface of said mirror glass.

18. The mirror assembly of claim 17 wherein said first and second interior side surfaces taper inwardly toward each other to a base surface of said glass receiving channel so that said mirror glass is wedged into said glass receiving channel for eliminating play between said mirror glass and said glass clamp.

19. The mirror assembly of claim 18 wherein said guide prong is received into a complementary elongated guide slot in said housing, wherein said guide prong travels along said guide slot to control lateral shifting of said glass clamp on said housing, and said guide prong is only removable from said guide slot when said glass clamp is moved to said unlocked position.

20. The mirror assembly of claim 19 wherein said locking projections are each received into a respective complementary housing recess when said glass clamp is in said unlocked position, and said locking projections engaging said housing when in said locked position.

21. The mirror assembly of claim 20 wherein each of said locking projections extend laterally outward from a side wall of said glass receiving channel.

22. The mirror assembly of claim 20 wherein said locking projections are spaced apart from a bottom surface of said glass clamp to define a housing receiving channel so that a portion of said housing is disposed between each of said locking projections and said bottom surface in a friction fit arrangement when said glass clamp is in said locked position.

23. The mirror assembly of claim 22 including an angled engaging surface disposed on each of said locking projections, wherein sliding said glass clamp to said locked position causes said angled engaging surface to bias against a portion of said housing so that said housing is wedged between said bottom surface and said angled engaging surface of said locking projections to secure said glass clamp to said housing.

24. The mirror assembly of claim 22 including a series of housing projections defining said housing recesses, and said locking projections being laterally spaced from each other to define a series of projection receiving gaps, wherein said housing projections are received through said projection receiving gaps into said housing receiving channel when mounting said glass clamp to said housing, and wherein a lateral shifting of said glass clamp biases said locking projections against said housing projections in a friction fit arrangement.

25. The mirror assembly of claim 24 including a knob disposed on an interior side of each of said housing projections biasing against said locking projections when said glass clamp is in said locked position for increasing said friction fit of said housing in said housing receiving channel of said glass clamp.

26. A glass clamp for an exterior vehicle mirror assembly, comprising:
a base plate for engaging a housing;
a glass receiving channel carried on said base plate for receiving said mirror glass in a friction fit arrangement;
wherein said mirror glass extends into said glass receiving channel and is positioned so that opposing side surfaces of said mirror glass directly engage opposing side surfaces within said glass receiving channel so that a perimeter edge portion of said mirror glass is secured within said glass receiving channel;

a guide prong carried by said glass clamp and laterally spaced from said glass receiving channel for engaging said housing; and, at least one locking projection carried on a side wall of said glass receiving channel and disposed between said glass receiving channel and said guide prong for engaging said housing in a friction fit arrangement to secure said mirror glass to said housing.

* * * * *